United States Patent [19]

Reil

[11] Patent Number: 4,818,459
[45] Date of Patent: Apr. 4, 1989

[54] LID OF A LIQUID PACK WITH PROCESS AND APPARATUS FOR PRODUCING THE SAME

[75] Inventor: Wilhelm Reil, Bensheim, Fed. Rep. of Germany

[73] Assignee: Tetra Pak Developpement S.A., Pully, Switzerland

[21] Appl. No.: 120,246

[22] Filed: Nov. 3, 1987

Related U.S. Application Data

[63] Continuation of Ser. No. 910,784, Sep. 23, 1986, abandoned, Continuation of Ser. No. 701,887, Feb. 15, 1985, abandoned.

[30] Foreign Application Priority Data

Feb. 15, 1984 [DE] Fed. Rep. of Germany ....... 3405253

[51] Int. Cl.⁴ ............................................. B29C 53/02
[52] U.S. Cl. .................................... 264/295; 264/296; 264/339
[58] Field of Search ............... 264/295, 296, 339, 320; 220/269, 270

[56] References Cited

U.S. PATENT DOCUMENTS

| | | | |
|---|---|---|---|
| 1,947,140 | 2/1934 | Rollason | 222/541 |
| 1,974,132 | 9/1934 | Bennett | 222/541 |
| 3,128,016 | 4/1964 | Ferri, Jr. | 222/529 |
| 3,307,602 | 3/1967 | Boster | 229/43 |
| 3,386,617 | 6/1968 | Shankland, Sr. | 220/94 R |
| 3,606,669 | 9/1971 | Kemble | 264/339 |
| 3,730,377 | 5/1973 | Brincks | 220/270 |
| 3,737,066 | 6/1973 | Ames | 229/7 R |
| 3,832,437 | 8/1974 | Taylor | 264/295 |
| 3,966,080 | 6/1976 | Bittel | 222/541 |
| 3,998,354 | 12/1976 | Song | 220/269 |
| 4,008,824 | 2/1977 | Renoux | 220/270 |
| 4,063,868 | 12/1977 | Piotrowski | |
| 4,078,700 | 3/1978 | Hidding | 264/295 |
| 4,391,385 | 7/1983 | Rausing | 220/269 |
| 4,393,979 | 7/1983 | Ball et al. | 220/270 |
| 4,525,319 | 6/1985 | Kaspe | 264/339 |

FOREIGN PATENT DOCUMENTS

| | | | |
|---|---|---|---|
| 3139780 | 4/1983 | Fed. Rep. of Germany | 229/7 R |
| 1220045 | 5/1960 | France | 222/541 |
| 7812180 | 6/1979 | Netherlands | 220/269 |
| 2010214 | 12/1978 | United Kingdom . | |
| 2039817 | 8/1980 | United Kingdom . | |

Primary Examiner—Jan H. Silbaugh
Assistant Examiner—Allan R. Kuhns
Attorney, Agent, or Firm—Biebel, French & Nauman

[57] ABSTRACT

A lid for a liquid pack is formed from a plastic material and includes a substantially flat end wall. A pouring spout is disposed within the outside contour of an outer first plane of the lid. An opening flap portion closes a pouring opening, and a handle is secured to the opening flap portion by a hinge. The opening flap portion is connected by way of an endless weakening line to the wall of the lid, and a collar is disposed at the periphery of the lid at an inwardly displaced position for mounting to a side wall of the pack. The weakening line extends in a second inner plane and at a spacing below and parallel to the first outer plane, with the spacing between the two planes being greater than or equal to the height of a collar portion projecting outwardly from the weakening line at the opening flap portion. The lid is first molded with the handle extending normally from the end wall, the mold is opened, and the handle is folded to a position substantially against the end wall while the handle is still in a plastic state.

4 Claims, 6 Drawing Sheets

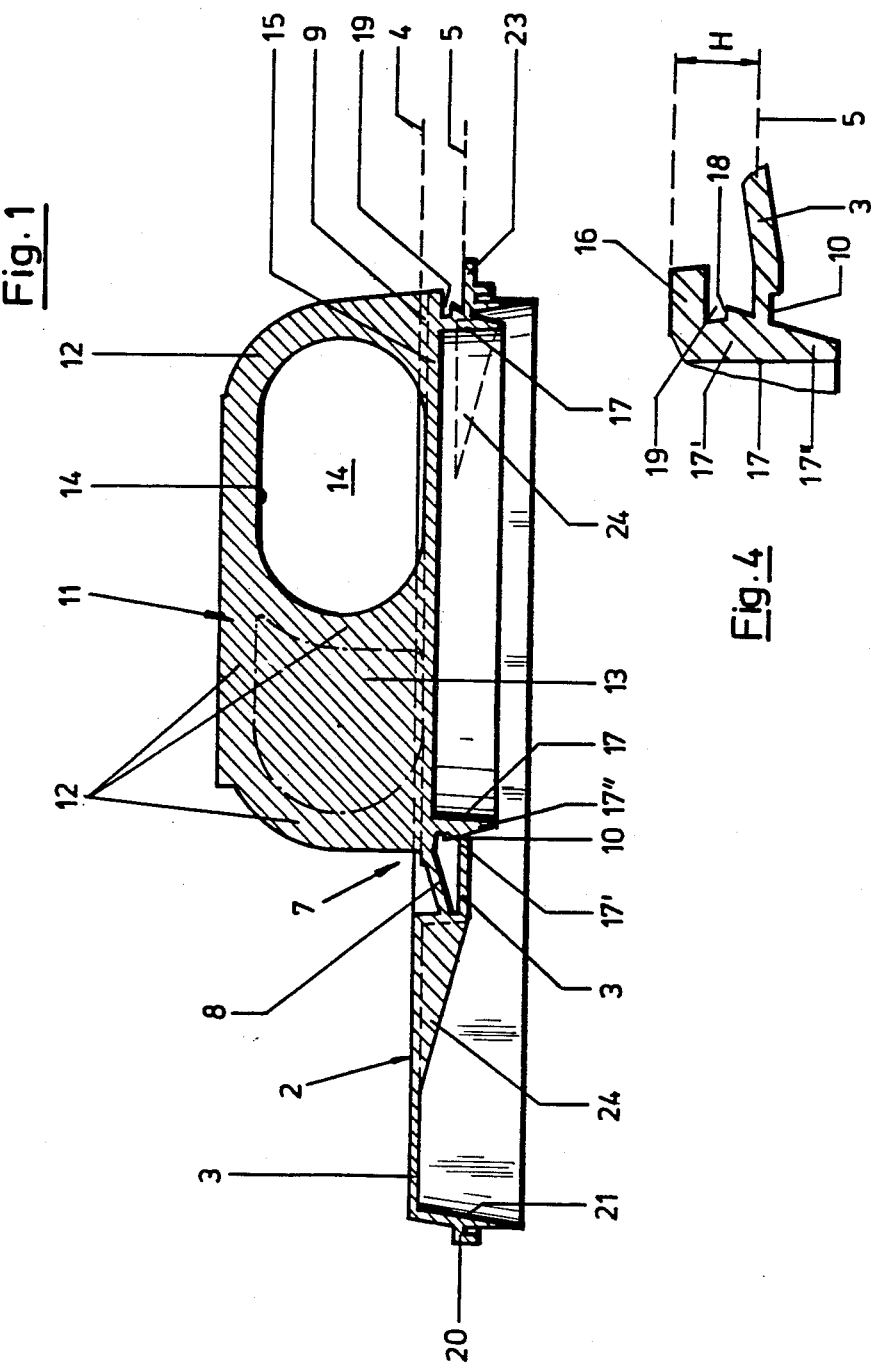

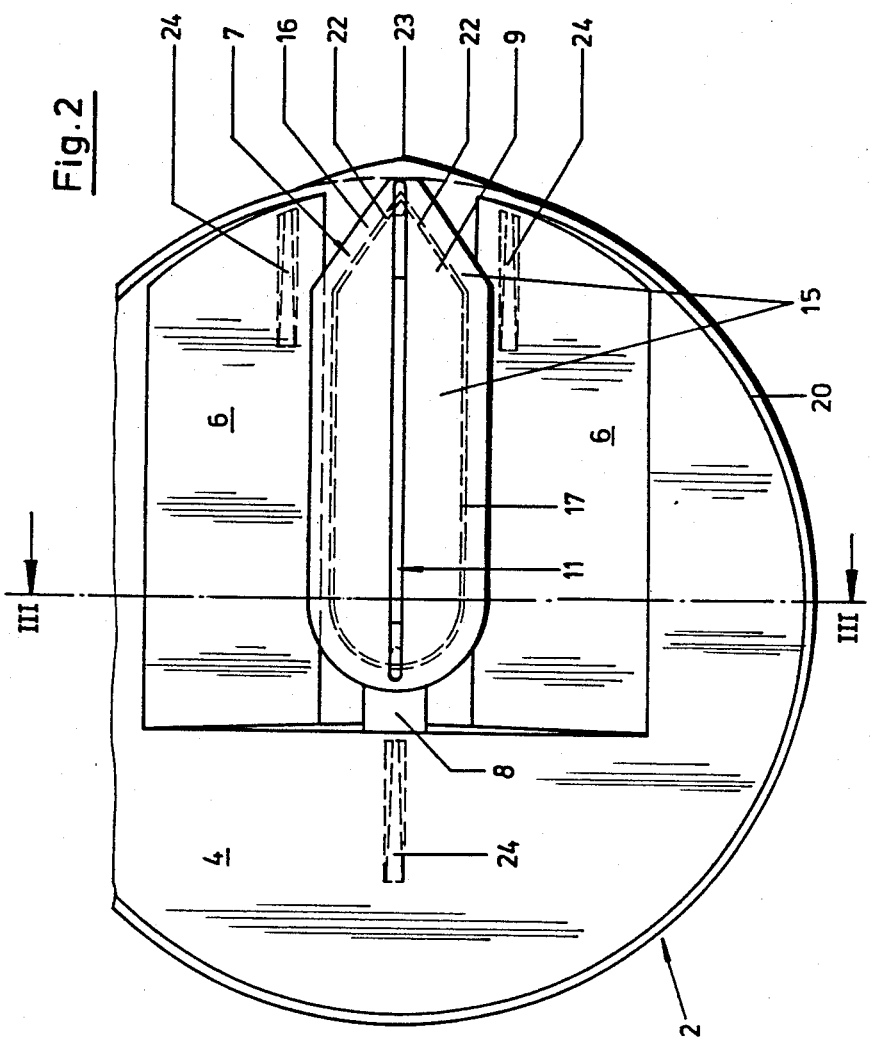

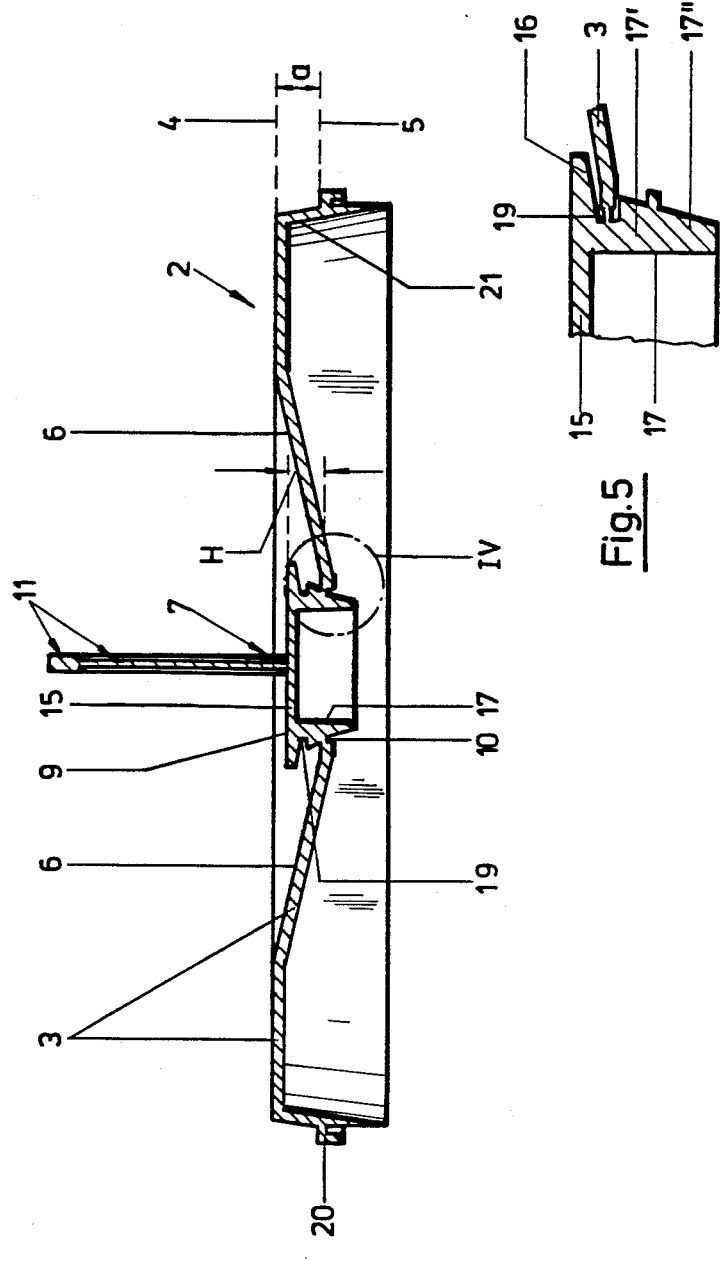

LID OF A LIQUID PACK WITH PROCESS AND APPARATUS FOR PRODUCING THE SAME

This is a continuation of Ser. No. 910,784 filed Sept. 23, 1986, now abandoned, which is a continuation of Ser. No. 701,887 filed Feb. 15, 1985, now abandoned.

BACKGROUND OF THE INVENTION

The present invention relates to a substantially flat end wall of thermoplastic material that forms the lid of a liquid pack. Included is a pouring means which is disposed within the outside contour of an outer first plane of the pack and which comprises an opening flap portion which closes a pouring opening and which is mounted to a hinge. A handle is secured to the opening flap portion, wherein the opening flap portion is connected by way of an endless weakening line to the wall of the lid. The pouring means further comprises a collar which is disposed at the periphery of the lid at an inwardly displaced position, for mounting to a side wall of the pack.

A lid or cover of this kind is disclosed in German Offenlegungschrift No. 31 39 780, wherein a liquid pack comprises tubular side walls of coated cardboard and end walls which are mounted to the ends of the tube. While one end wall, representing the bottom, is square or rectangular and is of the configuration referred to as a block bottom, the end wall forming the lid or cover of the pack comprises thermoplastic material without any carrier material. The plastics lid is ejected on to the side walls along the outside edge of the lid and has a pouring means which can be folded inwardly of the outside contour of the pack, for transportation purposes.

As is known in the art, attempts have been made to provide a suitable lid which is fluid-tight and easy to open, using simple production tools. The opening means in such a lid is disposed at the center thereof because it was considered particularly desirable for the lid or cover to have an upwardly convergently tapering wall leaving a central opening, with a centrally disposed, upwardly projection spout edge and a closure means secured thereto. This view was taken in the belief that the tools and in particular the injection molding mold for such a lid can then be of the most appropriate configuration. It has also already been found that, with the frustoconical configuration, any liquid which may have unintentionally escaped from the pack flows away outwardly so that the region of the lid remains substantially clean.

An apparatus for injection molding a plastics lid onto the tubular side walls is disclosed in German Offenlegungschrift No. 32 07 701, wherein the apparatus has an overall injection unit with a nozzle, an injection head member, an outside mold portion and a core which is movable relative to those components. With a continuous feed of the web-like material for the forming of the tube-like side walls, the apparatus disclosed in the above-identified specification can be used to inject a lid onto the side walls, at a high level of machine output. In such an arrangement, the core is disposed on the end of a mandrel which carries the tube. A mandrel wheel which is driven cyclically has mandrels which project radially in a plane at angular spacings from each other, and the outer mold portion which is disposed in opposite relationship to the core has mold parts which can be moved apart and towards each other, relative to the mandrel on at least two sides, to clear the circular movement path of the mandrel. By virtue of the rotary movement of the respective mandrel together with the mandrel wheel, the free end of the tube at which the plastics lid is to be injected thereonto is rotated into a position in alignment with an injection machine. In such an arrangement, the mandrels represent injection tool bottom portions, that is to say, core carriers, and the injection molding space if formed, towards the side by the outer mold parts, and upwardly by a head plate.

The outer mold parts cyclically move apart and provide space for the successive mandrels to be moved in and out with a rotary movement. The outer mold parts are pivoted about axes and move on circular arcs between the open and closed positions. The drive means is formed by draw rods which engage the support arms of the outer mold parts by way of ball joints.

SUMMARY OF THE INVENTION

The object of the present invention is to further improve the production process, the apparatus and the lid produced thereby for the described liquid pack. In particular, the invention seeks to provide, using simple means, a lid which permits advantageous transportation, a good seal with respect to the opening means, and easy opening and reclosing thereof.

With regard to the lid itself, and in accordance with the present invention, the object is achieved in that the weakening line extends in a second inner plane and at a spacing from and parallel to the first outer plane, with the spacing between the two planes being greater than or equal to the height of the collar portion which projects outwardly from the weakening line at the opening flap portion. If a lid or cover comprises only plastics material in a per se known manner and is formed or injected in an advantageous final form, the cover will be fluid-tight and can be satisfactorily opened by way of the above-mentioned weakening line. If the weakening line is disposed in the second inner plane, whereas the whole of the outside contour of the lid is within the first outer plane, the novel pack has a good standing or stacking capability and thus is advantageous in regard to transportation. The collar portion on the opening flap portion which in the manner described projects upwardly and outwardly from the second inner plane forms an edge or rim portion which has an advantageous effect when reclosing the pack.

In contrast to the known pack set forth in the background part of this specification, and to its frustoconical lid or cover configuration, the lid according to the present invention has an outer flat surface or first plane. Thus, the feature which is additionally to be found in other known packs, namely that the frustoconical lid which comprises purely plastics material can be folded inwardly of the outside contour of the finished pack, can be avoided in accordance with the invention. Use or opening of a pack having such a feature is not particularly agreeable, either from the point of view of the manufacturer or from the point of view of the final consumer, if prior to transporting the pack, the centrally upwardly projecting opening means has to be pressed into the volume of the pack, within the outside contour thereof, or has to be pulled out by the final consumer for the purposes of opening the pack. With the lid in accordance with the invention, such considerations and handling operations are not required either for transportation or for opening of the pack.

In addition, in accordance with the invention, it is advantageous if the transition between the outer first plane and the inner second plane is provided by inclined surfaces, preferably two oppositely disposed flat inclined surfaces. That configuration has a particularly advantageous effect in regard to simplifying the tooling. With the known apparatus described above, the outer mold parts are pivoted about axes by way of draw bars, with the radius of the circular movement of the outer mold parts themselves being comparatively large. Such is the case more particularly when the mounting arms for the outer mold parts, i. e., the length between the pivot axes and the outer mold parts themselves, are large. In that case, the curved circular path of movement in the region of the lid to be molded is almost comparable to a straight line so that it is also possible for inclined surfaces to be produced with such a tool. In other words, outer mold parts, without additional slider members, can be used to form the lid according to the invention, while it is nonetheless possible to produce the two planes described above, being disposed at a spacing from each other and parallel to each other.

In accordance with the invention, it is particularly advantageous if, in plane, the first outer plane is provided to extend in a U-shaped configuration around the inclined surfaces and the opening flap portion in such a way that the pointed end of the opening flap portion, at the outlet end thereof, is disposed at the periphery of the lid and between the free ends of the U-shape. In plan view, a lid which is injected onto a cylindrical tube is round. If the main part of the circular periphery of that lid is occupied in the above-described manner by the first plane which is of a U-shaped configuration, that arrangement gives a large support area and thus affords good transportation capability in respect of the novel liquid pack provided with the lid according to the present invention. Advantageously, the opening means is disposed in the center and towards one side, namely, between the free limb portions of the above-described U-shape, the space required for the opening means being provided by the two oppositely disposed inclined surfaces. If in addition the opening flap portion has a pointed end, the collar portion thereof, which projects out of the second inner plane, can also be of a correspondingly pointed configuration, thus giving excellent pouring properties. In addition, the forces for tearing open the pack can be advantageously applied by way of the pointed end.

In another advantageous embodiment of the invention, the opening flap portion is elongate in plan view and extends from the periphery of the lid approximately to the center thereof, the hinge of the opening flap portion preferably being disposed approximately in the outer first plane. By virtue of the two planes which are disposed parallel to each other and at a spacing from each other, the entire opening means with the opening flap portion (and in the final condition with the handle or gripping flap portion) is disposed in the region between the two planes so that the lid or cover of the finished, filled pack has an upper flat surface or outer first plane. No part of the opening projects beyond that flat surface. The surface for tearing open the pack is formed by the inner second plane.

The configuration of the opening flap portion, being elongate when considered in plan view, has the advantage that, when the pack is tilted when in an open condition, the stream of liquid from the pack first begins to flow on the side having the point, while in the middle region which is upward when the pack is tilted, the air which is required to flow into the pack by virtue of the content of the pack being poured out can flow into the pack from the exterior. Arranging the point of the opening flap portion at the periphery of the cover also ensures that the stream of liquid being poured out breaks away from the pack at the right time, and does not have to flow over a part of the lid.

The hinge between the wall forming the lid or cover and the opening flap portion is advantageously of a long, flexible configuration so as to facilitate the operation of opening the pack and reclosing it, from the point of view of the final consumer. In addition, in the injection molding operation, the channel or passage for the hinge in the injection molding tool serves as a flow duct for the liquid plastics material to flow from one volume to the other. The greater the number of flow ducts of that kind, which for example bridge over the narrow separation edge portion at the edge of the collar portion of the opening flap portion, the quicker and better the injection molding operation can be carried out.

It is also advantageous, in accordance with the present invention, if the periphery of the lid has a radial projection beside the pointed end of the opening flap portion at the level of the inner second plane, forming a pointed pouring spout. The separation or breaking away of the stream of liquid being poured out of the pack, which has already been referred to above, is considerably assisted by the above-mentioned projection which projects radially outwardly from the periphery of the lid at a point thereon. It is known that a poured stream of liquid separates or breaks away from a pointed end or a projection considerably more easily than from an edge which is straight or only slightly curved. The periphery of the lid represents an edge which is only slight curved so that a pointed projection at one location considerably improves the pouring of the liquid from the pack; in that connection, the tools and measures for achieving that improvement are very simple and are therefore particularly preferred.

If, in accordance with another advantageous embodiment of the cover or lid, the collar portion of the opening flap portion, which partly projects inwardly from the weakening line of the second inner plane, is of a conical or tapered configuration at its outside periphery, then such collar portion is in the form of an injection cone means. After the opening flap portion has been torn upwardly and the pouring operation has been concluded for the purposes of reclosing the pack, the opening flap portion can be very conveniently introduced by means of the insertion cone, into the opening formed by tearing opening the pack, and the opening flap portion can be secured in that position by being snapped into an engaged condition.

In accordance with the invention, it is also highly advantageous if the part of the collar portion of the opening flap portion, which projects outwardly from the second inner plane from the weakening line, is of a conical configuration with a dimension which increases outwardly and upwardly to the flat wall of the opening flap portion. Further, there can be an undercut configuration between the flat wall of the opening flap portion and the upper end of the centrally conical collar portion. These features provide for advantageous reclosure of the pack. The first mentioned, outwardly projecting conical collar portion of the opening flap portion, upon reclosure of the pack, affords a slight resistance which is highly advantageous in regard to the snap engagement effect and securing the opening flap portion in position upon reclosing of the pack. A particular effect is achieved in this regard by virtue of the last-described undercut configuration between the flat wall of the opening flap portion and the upper end of the outwardly concical collar portion. More specifically, the endless tear-off edge of the opening is brought into snap engagement in the undercut configuration, and is held in position therein, after the above-mentioned edge has passed over the conical outer collar portion.

In addition, reclosure of the pack is favored if, in accordance with the invention, the wall of the opening flap portion has a projecting edge, forming a closure aid means, in a radially outward direction. Opening means are particularly advantageous if the final consumer does not need to read instructions and give close attention and thought to what is involved. With the opening means according to the invention, the consumer will grasp the gripping flap portion and pull thereon. By virtue of the pointed configuration of the opening flap portion at one side, the pulling forces are applied particularly strongly at that point so that the flap portion begins to tear open at the point and, upon the pulling force continuing to be applied, progresses toward the lid center, that is to say, towards the oppositely disposed end of the opening flap portion. After the pack has been opened and some of the contents poured out, the user of the pack can then reinsert the opening flap portion into the hole by means of the above-mentioned insertion cone means, and can make particular use of the snap-engagement effect by virtue of the user of the pack pressing the flap upper wall of the opening flap portion into the opening, without paying particular attention thereto. The projecting edge or rim forms a closure aid means which is disposed virtually at the entire periphery of the opening flap portion so that the person using the pack can press on the opening flap portion, using a finger at any location thereon, for the purpose of producing the above-mentioned snap engagement until the pack has been reclosed in the desired manner by virtue of the snap engagement. This also produces an audible effect.

In accordance with the invention, the known process for producing a lid or cover, as described in the background portion of this specification, is modified and improved in that after the injection molding operation the molding is removed from the mold easily so that the plastics material is still in the thermoplastic state. The lid is then held on the mold portion, and the handle bar portion which stands up perpendicularly out of the main plane of the lid is turned over through about 90° and hardens in that position.

Reference has been made throughout the foregoing description to simple tools and a simple production process. If only two outer mold parts are used for injecting a lid or cover shaped according to the invention, the gripping flap portion is desirably injection molded in a plane which is normal to the main plane of the cover or lid and in which the gripping bar or flap portion projects by a considerable amount from the external contour. Such a form, however, is undesirable from the point of view of transportation of the completed packs. However, injection molding of a gripping flap portion in the folded-over condition requires additional slider members in the mold, which means that the mold would be more complicated, which is a disadvantage.

If now the process according to the present invention is used, namely, the gripping flap portion is injection molded in a vertical position normal to the outer first plane, but is then removed from the mold at a very early stage when the plastics material is still plastic, it is possible for the molding, which is then free, to be transformed by means of a device for applying a pressure thereto. In accordance with the invention, a pressure-applying means which is actuated or designed in any fashion turns the gripping flap portion through about 90° into the space between the two above-mentioned planes of the cover or lid, in which case a suitable pressure has to be applied only to the base of the gripping flap portion. If the operation of applying pressure to the molding is performed sufficiently rapidly after the molding has been removed from the mold and before the plastics material stabilizes or sets, the desired outside contour is guaranteed in a very simple and reliable manner.

The invention also provides an apparatus for producing the cover or lid of the general kind set forth in the background portion of this specification, wherein, by means of the apparatus, the lid can be injected on a portion of flexible, web-like material. The apparatus is provided with a core and a two-part outer mold portion, the two mold parts of which are pivotable about an axis of rotation. Attention has already been directed in the background portion of this specification to the known design of such an apparatus. However, in order for the advantages which are desired in accordance with the present invention to be achieved, it is necessary, that the mold parts have only one common plane of separation, in which the mold form for the handle flap portion is formed.

Thus, that plane of each outer mold part which comes into contact with the plane of the oppositely disposed outer mold part forms the plane of separation which provide between the parts the volume or cavity for the handle flap portion. If, with such a particularly simple tool, the handle flap portion then projects perpendicularly out of the main plane of the lid, that disadvantage can nonetheless be overcome by the above-described step of turning over the handle flap portion while in the thermoplastic condition. It is then possible to use a particularly simple tool, while nonetheless the objects of the invention are nonetheless still achieved.

In another advantageous embodiment of the invention, a separately arranged and synchronously controlled pressure piston for turning over the handle flap portion while still in a partly plastic conditon, inwardly of the outside contour, within the first outer plane, is disposed downstream of the whole injection unit, in the direction of working. Although the operation of applying pressure may be carried out by any suitable means and possibly also by hand, it is desirable to provide a pressure piston which is arranged separately from the molding station and the overall injection unit, and which is controlled synchronously. For example, a piston may pneumatically actuate the pressing piston so that the operation of applying pressure to the handle flap portion can be carried out using very simple means.

The effect of snap engagement, which was described above with respect to the reclosing of the pack, is further promoted, in addition to the undercut configuration and the closure aid means, by virtue of the fact that a zig-zag tear-opening edge is formed along the weakening line, after the pack has been opened. The zig-zag shape is formed when the pack is torn open, by partial stretching of the plastics material in the region of the weakening line so that, to supplement the effect of the undercut configuration, this arrangement additionally provides a partial reduction in size of the opening itself, in comparison with the opening flap portion with its collar portion. By virtue of such an arrangement, reclosure of the pack is more secure and is not only sealed with respect to dust, but is essentially sealed with respect to liquid slopping out of the pack, insofar as reference can properly be made to fluid tightness, after the pack has been reclosed.

An interesting consideration in regard to the process and the apparatus for producing the lid or cover according to the invention is also that for example the handle flap portion can simply be injected in position with residual heat. The handle flap portion can be made in a very flat configuration by the two outer mold parts and may optionally comprise a pull ring which can be produced without the need for an additional, particularly high supply of heat. By virtue of that arrangement, the molding can be more quickly removed from the mold and the output of the whole machine can be increased.

Further advantages, features and possible uses of the present invention will be apparent from the following description of the preferred embodiment, with reference to the accompany drawings.

BRIEF DESCRIPTION OF THE DRAWINGS

FIG. 1 is a view in section through the center of a lid or cover in accordance with the present invention, taken directly after removal of the lid from the mold, with the handle flap portion standing up;

FIG. 2 shows a partly broken-away plan view of the lid shown in FIG. 1;

FIG. 3 shows a view in section taken along line III—III in FIG. 2;

FIG. 4 shows a view on an enlarged scale of the portion indicated at IV in FIG. 3;

FIG. 5 is a view of a portion similar to that shown in FIG. 4, but taken after opening and reclosing of the pack;

DESCRIPTION OF THE PREFERRED EMBODIMENT

Figure 6:
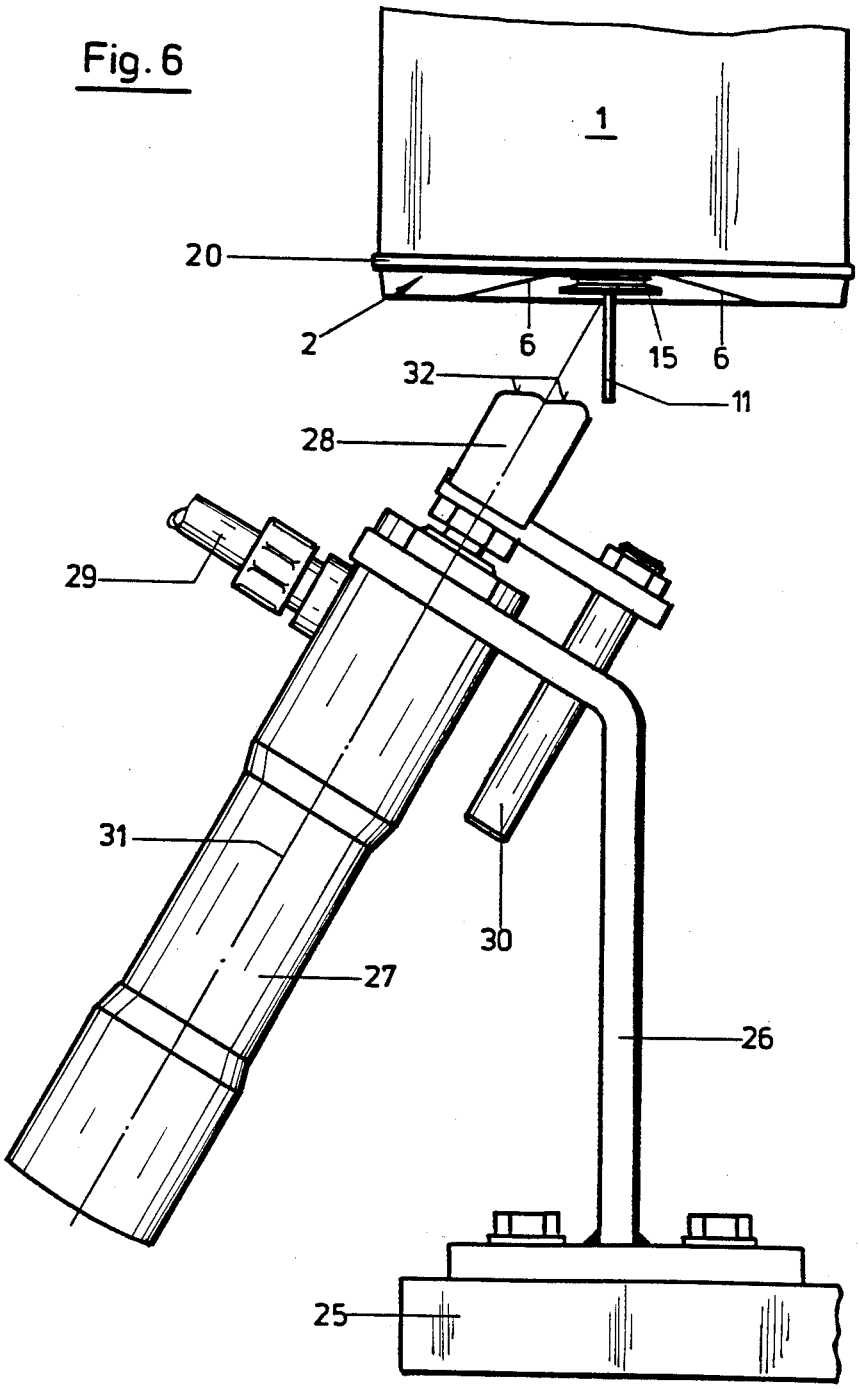
FIG. 6 is a diagrammatic view of a part of a pressure piston in production apparatus for the lid, shown in connection with a lid before its handle flap portion is laid over.
Figure 7:
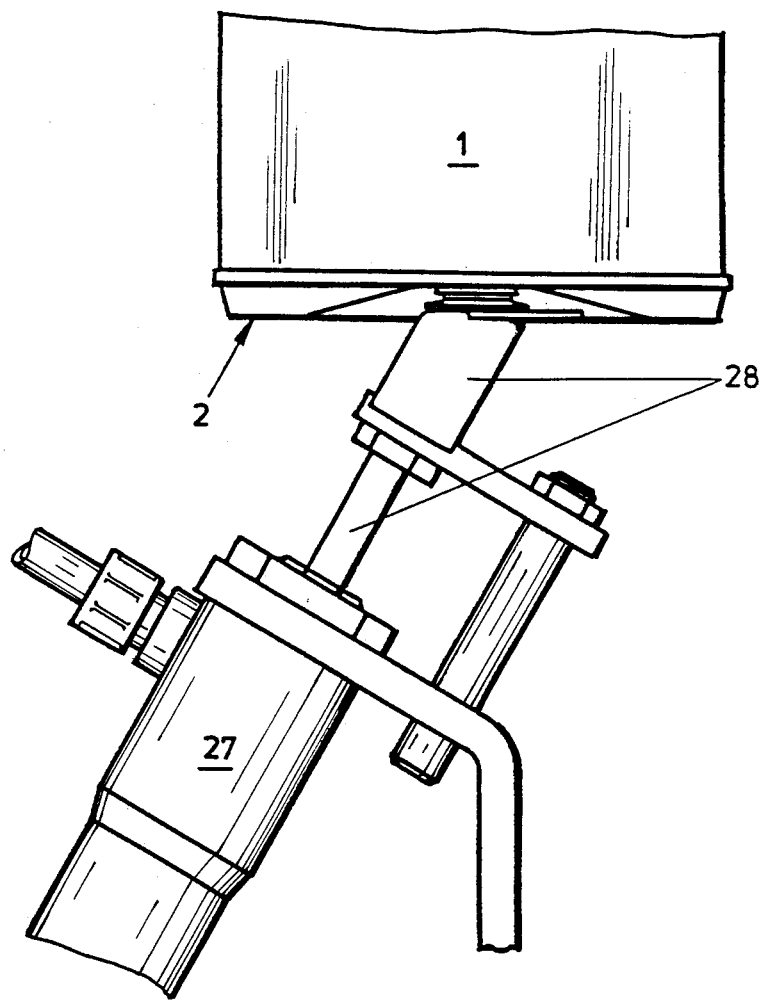
FIG. 7 shows a portion of a view similar to FIG. 6, but following the step in which the handle flap portion is laid over.
Figure 8:
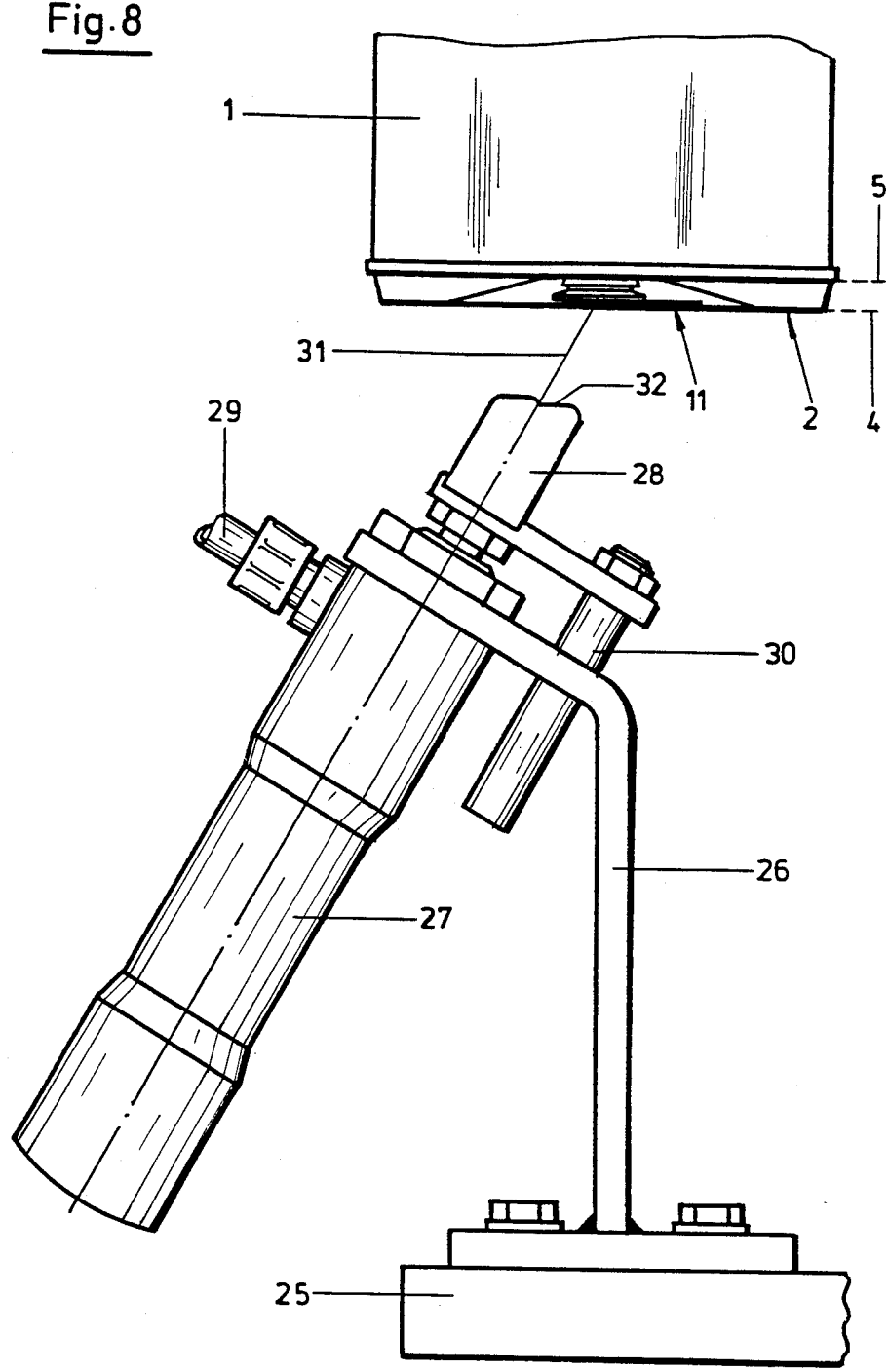
FIG. 8 shows a view similar to FIG. 6, but following both the steps wherein the handle flap portion has been laid over and the piston withdrawn.

Initial reference should be made to FIGS. 6-8, wherein a portion of the cylindrical tube 1 of the side walls of the liquid pack is shown. Onto tube 1 a circular end which forms the lid or cover generally denoted at 2 is injected, in the form of a flat end wall of the pack.

The lid 2 itself is shown in various views in FIGS. 1 to 3 without the pack. The wall 3 of the lid is disposed both in an outer first plane 4 and in an inner second plane 5, with the transition between the two planes 4 and 5 being by means of inclined surfaces 6. The pouring opening which is generally denoted by reference numeral 7, comprises an opening flap portion 9 which is mounted to a hinge 8 and which is connected by way of an endless weakening line 10 to the wall 3 of the lid which is in the inner second plane 5. In the views shown in FIGS. 1 to 3 and 6, a handle or gripping flap portion 11 is shown in the injection position in which the flap portion 11 is disposed normal to the parallel planes 4 and 5. The flap portion 11 is formed from pulling and connecting eyes 12 (which also serve as flow or injection ducts in the injection molding operation), a filling skin portion 13, and a gripping opening 14.

FIGS. 7 and 8 show the flap portion 11 in the condition in which it has been laid over through about 90° and in which the flap portion 11 lies within the outside contour of the pack, that is to say, within the outer first plane 4.

The base of the flap portion 11 is formed on the flat wall 15 of the opening flap portion 9, an edge or rim 16 projecting outwardly to form a closure support or aid means.

The opening flap portion 9 is elongate, the long side being shown in FIGS. 1 and 2 and the narrow side, in a view transversely with respect thereto, being shown in FIG. 3. From the flat wall 15 of the opening flap portion 9, a collar portion 17 projects downwardly, the collar portion 17 having an upper part 17' which is of a conical or tapered configuration to an increasing degree outwardly from the second inner plane 5, upwardly to the wall 15 of the opening flap portion, just like the lower part 17" which extends in a conical configuration beneath the inner second plane 5 further inwardly to the inside of the closed pack. Disposed between the upper part 17' and the lower part 17" of the collar portion 17 is the weakening line as can be clearly seen from FIG. 4. An undercut configuration 19 is provided between the flat wall 15 of the opening flap portion 9 and the upper end 18 of the externally conical collar portion 17.

FIG. 5 shows the way in which the wall 3 of the lid snaps into the undercut configuration 19 and is held in the engaged condition by way of the outwardly projecting conical configuration of the upper part 17' of the collar 17.

At its periphery, the lid 2 is externally provided with a collar 20 which receives the free cut edge of the tube 1 and engages over the same so that the plastics material of the lid 2, at least in the edge region, is in contact with both oppositely disposed, plastics-coated outsides of the coated material of the tube, and is anchored in that region on the two external coatings. The conical shape of the edge of the lid, as indicated at 21, is provided for facilitating removal of the molding from the mold.

FIGS. 1 and 3 clearly show that the spacing a between the first outer plane 4 and the second inner plane 5 is larger than the height H of the upper part 17' of the collar portion 17 of the flap portion 9, said upper part 17' projecting outwardly from the weakening line 10 on the flap portion 9.

FIG. 2 clearly shows the way in which the outer first plane 4 extends in a U-shaped configuration around the inclined surfaces 6 and the flap portion 9, with the two free limbs of the U-shape being arranged on the right in FIG. 2. Also to be found at that location is the point or tip of the flap portion 9, to which the pulling eye 12 is fitted and at which, when opening the pack, the flap portion begins to tear away, by way of the tear-off edges 22.

In the region of the periphery of the lid and at the level of the inner second plane 5, FIG. 2 shows the radially projecting projection 23 (see also at the right in FIG. 1), which acts as a pointed pouring spout.

A number of stiffening ribs 24 which are not an essential aspect of the invention are illustrated at various locations.

With regard to the apparatus for producing the lid or cover shown in FIGS. 1–5, reference is made to the above-mentioned German Offenlegungsschrift No. 32 07 701, which is hereby specifically incorporated by reference, and in particular to FIG. 4 therein. A mandrel wheel carrying several mandrels thereon is rotated about an axis, the particular mandrel on the wheel which is in the upper position being disposed in the general injection unit. In that position, and by means of two arms which pivot about the above-mentioned axes which are parallel to each other and which are disposed horizontally, the outer mold parts are disposed in such a way as to extend around the upper free end of the mandrel. For the purposes of removing the molding from the mold, the two support arms rotate about the axes in an outward direction, thereby clearing the rotary path of movement for the mandrel.

Immediately after forming the lid and removing it from the mold, the wheel is rotated through a given angular distance to the position shown in FIGS. 6 to 8. A pressure cyinder 27 with pressure piston 28 is secured by way of a mounting 26 to the frame component which is shown in broken-away form at 25 in FIG. 6, and is actuated by way of hydraulic or pneumatic lines 29. A guide rod 30 provides for precise guidance of the piston 28 in the direction of the axis 31 indicated by the dash-dotted line. FIGS. 6 to 8 also show the contoured suface 32 of the piston 28 which permits an inclined surface for surface contact against the flat wall 15 of the flap portion 9. In addition, the outer and correspondingly inclined disposed surface 32 of the piston 28 is provided wth a step for receiving the gripping flap portion 11 for folding it over and in the folded-over condition as shown in FIG. 7.

FIG. 6 shows the starting condition when the lid 2 and its flap portion 11 have just been removed from the mold and the plastics material is still in a plasticized condition. Actuation of the cylinder 27 by way of the line 29 causes the piston 28 to be extended into the position shown in FIG. 7, the piston 28 thus pressing the flap portion 11 through about 90° and disposing it within the outside contour of the pack. While the piston 28 is being withdrawn again so that it moves into the position shown in FIG. 8, the flap portion 11 remains in the laid-over condition and the plastics material hardens, so that the desired flat surface on the pack is achieved in the outer first plane 4.

While the process and product herein described constitute preferred embodiments of this invention, it is to be understood that the invention is not limited to this precise process and product, and that changes may be made therein without departing from the scope of the invention which is defined in the appended claims.

What is claimed is:

1. A method of forming a lid for a liquid pack, comprising the steps of:
   molding in a mold from a thermoplastic material in a plastic state an end wall for the pack, said end wall having a peripheral edge, said end wall defining a pouring opening therein, an opening flap portion having a planar cover wall and a collar depending from said cover wall about the periphery thereof, said collar fitting securely within said pouring opening, a hinge connected to said opening flap and said end wall, and a planar handle connected to said end wall along a handle base to extend normally outward from said end wall;
   opening said mold at least sufficiently to expose said handle and an outer surface of said end wall;
   folding said handle, while still in a plastic state, through 90° substantially along said handle base to a position against said cover wall; and
   retaining said handle in said position until said thermoplastic material hardens, whereby said handle is disposed in said position to facilitate stacking prior to initial opening of the pack, and may be returned to an upright position by a user to facilitate opening of the pack.

2. The method as defined in claim 1, wherein said mold includes a supportive mandrel for defining an inside of said lid, and first and second mold halves for defining an outside of said lid, said handle being formed between said first and second mold halves, and wherein opening said mold is accomplished by pivotally moving said mold halves away from said lid and said handle.

3. The method as defined in claim 1, wherein folding of said handle is performed by extending a piston from a remote position away from said lid into contact with said handle, and pushing said handle with said piston to said position against said cover wall.

4. The method as defined in claim 3, wherein said handle is retained in said position against said cover wall until said thermoplastic material hardens by said piston.

* * * * *